(12) United States Patent
Catheline et al.

(10) Patent No.: US 11,449,011 B2
(45) Date of Patent: Sep. 20, 2022

(54) OPTICAL DEVICE FOR A TIMEPIECE

(71) Applicant: ROLEX SA, Geneva (CH)

(72) Inventors: Adrien Catheline, Valleiry (FR); Benoit Junod, Contamine-sur-Arve (FR); Sébastien Perseguers, Fribourg (CH)

(73) Assignee: ROLEX SA, Geneva (CH)

( * ) Notice: Subject to any disclaimer, the term of this patent is extended or adjusted under 35 U.S.C. 154(b) by 785 days.

(21) Appl. No.: 16/419,735

(22) Filed: May 22, 2019

(65) Prior Publication Data

US 2019/0369564 A1    Dec. 5, 2019

(30) Foreign Application Priority Data

May 30, 2018 (EP) .................................... 18175014

(51) Int. Cl.
| | | |
|---|---|---|
| *G04B 39/00* | (2006.01) | |
| *G02B 3/04* | (2006.01) | |
| *G02B 27/00* | (2006.01) | |

(52) U.S. Cl.
CPC ............ *G04B 39/008* (2013.01); *G02B 3/04* (2013.01); *G02B 27/0012* (2013.01); *G04B 39/004* (2013.01)

(58) Field of Classification Search
CPC .... G04B 39/00; G04B 39/002; G04B 39/004; G04B 39/006; G04B 39/008; G02B 3/04;
(Continued)

(56) References Cited

U.S. PATENT DOCUMENTS

| 1,812,367 A | 6/1931 | Pief |
|---|---|---|
| 4,944,574 A | 7/1990 | Roote et al. |
| | (Continued) | |

FOREIGN PATENT DOCUMENTS

| CH | 710775 A2 | 8/2016 |
|---|---|---|
| EP | J 277 024 A1 | 8/1988 |
| | (Continued) | |

OTHER PUBLICATIONS

European Search Report and Written Opinion dated Jan. 28, 2019 issued in counterpart application No. EP18175014; w/ English machine translation (17 pages).

*Primary Examiner* — William R Alexander
(74) *Attorney, Agent, or Firm* — WHDA, LLP

(57) ABSTRACT

A timepiece glass, in particular a watch glass, wherein it comprises an optical device comprising at least one lens intended to enlarge an indication supplied by a timepiece, said lens comprising at least one aspherical face comprising at least one section passing through a vertical plane comprising an optical axis of vertical direction z, of which at least one outline can be defined by the following equation:

$$z(r) = \frac{r^2}{R\left(1 + \sqrt{1-(1-\kappa)\frac{r^2}{R^2}}\right)} + \alpha_4 r^4 + \alpha_6 r^6 + \ldots$$

in which R is the nominal radius of curvature, k is the constant of conicity, and $\alpha_{(4,6,\ldots)}$ is or are coefficient(s) of asphericity, and in which at least the constant of conicity k and/or at least one coefficient of asphericity is different from zero.

20 Claims, 5 Drawing Sheets

(58) Field of Classification Search
CPC ...... G02B 3/02; G02B 13/002; G02B 13/005; G02B 13/18
USPC ........................................................ 368/296
See application file for complete search history.

(56) References Cited

U.S. PATENT DOCUMENTS

| | | | | |
|---|---|---|---|---|
| 5,566,137 | A * | 10/1996 | Chevroulet | G04B 39/008 368/239 |
| 6,406,769 | B1 * | 6/2002 | Delabre | B24B 13/00 428/66.5 |
| 6,456,569 | B1 * | 9/2002 | Stauffer | G04B 39/008 368/294 |
| 2005/0133478 | A1 * | 6/2005 | Kim | G02B 3/04 216/26 |
| 2006/0062090 | A1 | 3/2006 | Ast et al. | |
| 2006/0077570 | A1 * | 4/2006 | Ferri | G04B 39/008 359/802 |
| 2021/0011435 | A1 * | 1/2021 | Keller | G04G 21/02 |
| 2021/0191331 | A1 * | 6/2021 | Debaud | G04F 7/0866 |
| 2021/0191332 | A1 * | 6/2021 | Tortora | G04B 45/0038 |

FOREIGN PATENT DOCUMENTS

| | | |
|---|---|---|
| FR | 1 130 973 A | 2/1957 |
| JP | S61-205889 A | 9/1986 |

* cited by examiner

OPTICAL DEVICE FOR A TIMEPIECE

This application claims priority of European patent application No. EP18175014.2 filed May 30, 2018, the content of which is hereby incorporated by reference herein in its entirety.

INTRODUCTION

The present invention relates to an optical device for a timepiece. The invention relates also to a timepiece glass comprising such an optical device. Finally, the invention relates also to a timepiece comprising such an optical device.

STATE OF THE ART

A traditional solution for optimizing the visibility and improving the ease of reading of an indication on a timepiece consists in incorporating a lens on the timepiece which enlarges the indication to be read. It appears however that the existing solutions allow for an optimized reading vertically above the lens, but are less efficient when the wearer of the timepiece is offset relative to the timepiece and therefore relative to the lens. In practice, it is found that a simple offset beyond approximately 10°, for a given lens and indicator of a horological indication, no longer allows for the benefit of the advantageous reading of the horological indication through the lens, nor even outside of the lens. Thus, this traditional solution turns out to be optimizable because of such a usage limitation.

The general objective of the invention is to offer a solution for improving the reading of an indication on a timepiece, which does not include all or some of the drawbacks of the state of the art.

More specifically, a first object of the invention is to offer a more user-friendly solution for reading an indication on a timepiece. In particular, the general object of the invention is to offer an enlarged reading of an indication, visible over a greater angular range compared to the state of the art.

BRIEF DESCRIPTION OF THE INVENTION

To this end, the invention is based on a glass for a timepiece, in particular for a watch, wherein it comprises at least one lens comprising at least one aspherical face comprising at least one section passing through a vertical plane comprising an optical axis of vertical direction z, of which at least one outline can be defined by the following equation:

$$z(r) = \frac{r^2}{R\left(1 + \sqrt{1-(1-\kappa)\frac{r^2}{R^2}}\right)} + \alpha_4 r^4 + \alpha_4 r^4 + \ldots$$

in which R is the nominal radius of curvature,
k is the constant of conicity, and
$\alpha_{(4,6,\ldots)}$ is or are coefficient(s) of asphericity,
and in which at least the constant of conicity k and/or at least one coefficient of asphericity is different from zero.

The at least one lens can comprise at least one outer envelope surrounding it fully made of non-deformable rigid material or the at least one lens can be fully made of non-deformable rigid material and/or the at least one lens can be produced in a hard crystalline material.

The invention relates also to a timepiece as such, comprising such a glass.

The invention is more specifically defined by the claims.

BRIEF DESCRIPTION OF THE FIGURES

These objects, features and advantages of the invention will be explained in detail in the following description of particular embodiments given as nonlimiting examples in relation to the attached figures in which.

Figure 1:
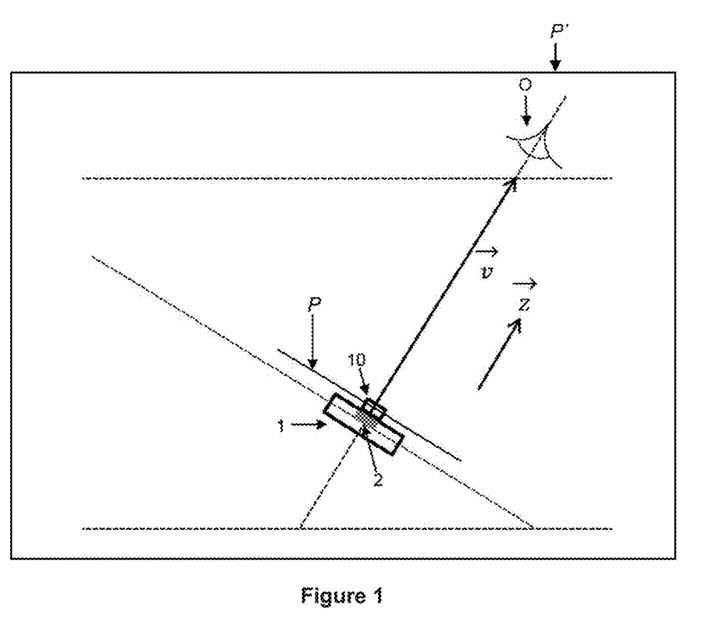
FIG. 1 represents the reference positioning of an observer relative to a timepiece according to an embodiment of the invention.

FIG. 1 represents a timepiece 1 according to an embodiment of the invention, which comprises at least one indicator 2, for example arranged on a dial. The timepiece comprises an optical device 10 on its top surface, arranged substantially above the indicator 2. The timepiece, and in particular its top surface, extends substantially in a plane P, which will be considered by convention to define a horizontal surface.

To simplify the following description, the direction at right angles to the horizontal plane P of the timepiece will be denoted vertical direction z. FIG. 1 illustrates the reference positioning of an observer O who is looking at the timepiece, and in particular the indicator 2, from a position situated on a vertical axis passing through the center of the indicator 2. More specifically, the vector v linking the indicator to the eye of the observer is oriented along the vertical direction z. This reference position of the observer is generally that which allows him or her the best legibility of the indicator 2.

In addition, the adjective "top" is defined so as to denote a component or a surface of a timepiece oriented on the side of an observer O of the timepiece. By contrast, the adjective "bottom" denotes a component or a surface of a timepiece oriented on the side opposite an observer of the timepiece, for example on the side of the wrist of a wearer in the context of a wristwatch.

Figure 2:
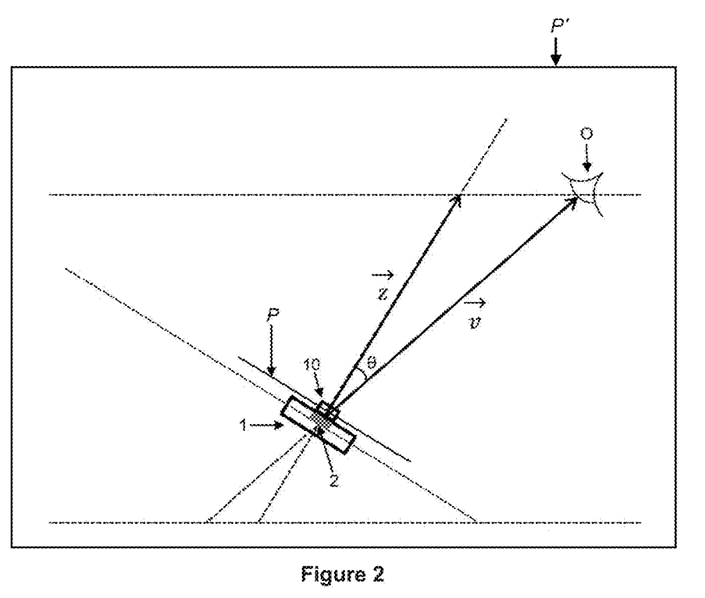
FIG. 2 represents the offset positioning of an observer relative to the timepiece according to the embodiment of the invention.

FIG. 2 illustrates an alternative offset positioning of an observer O in relation to the timepiece 1 relative to the reference position defined by FIG. 1. This offset is measured by the angle Θ between the abovementioned vertical direction z and the vector v. Note that the observer can be offset in a first direction situated on a certain side relative to the vertical direction z or in a second opposite direction relative to this same vertical direction. In these two directions, an observer can empirically find respectively the two angles Θmin and Θmax, illustrated in FIG. 3, beyond which an additional offset no longer allows him or her to view the indicator 2 of the timepiece.

Figure 3:
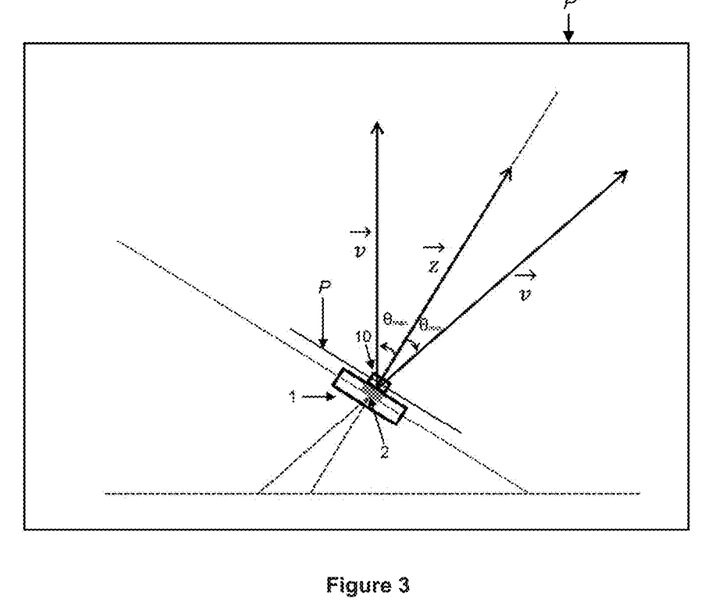
FIG. 3 represents the angular range of observation of the timepiece according to the embodiment of the invention.

Note that these two offsets are preferably found by a displacement of the gaze of the observer in one and the same plane P', which would be a vertical plane passing through the indicator 2 and substantially parallel with a direction extending from the 6 and 12 hour marks of the timepiece, according to a traditional approach of positioning of these hour marks. Naturally, this same offset can be realized along vertical planes in all the other directions, to ultimately make it possible to determine substantially a cone of vertical axis centered on the indicator, within which the legibility of the indicator is good. Such a cone could have an ellipsoid base, defining minimum and maximum angles relative to said vertical direction, which could thus, in a variant, define the two angles Θmin and Θmax.

As mentioned in the introduction of the invention, the technical problem raised therefore consists in optimizing the two angles Θmin and Θmax, that is to say in increasing the amplitude of the range of good legibility or visibility. In other words, the invention seeks to allow a good legibility or visibility of the indicator 2 from an increased offset positioning of an observer.

According to the concept of the invention, an optical device comprising at least one lens comprising at least one surface or face portion of aspherical form is used. It will also be more simply stated that the optical device comprises at least one lens comprising at least one aspherical face or that the optical device comprises at least one aspherical face. This optical device is arranged so as to be positioned between the indicator and an observer. It is therefore substantially superposed on an indicator to be observed, that is to say that it is located substantially above this indicator.

Such a face of aspherical form is more specifically defined by the fact that it comprises at least one section passing through a vertical plane comprising the optical axis of vertical direction z of the optical device, of which at least one outline is a curve which can be defined by the following equation (1):

$$z(r) = \frac{r^2}{R\left(1 + \sqrt{1-(1-\kappa)\frac{r^2}{R^2}}\right)} + \alpha_4 r^4 + \alpha_6 r^6 + \ldots \quad (1)$$

and in which the following condition is borne out: the constant of conicity κ or at least one value of a coefficient of asphericity $\alpha_i$ (i=4, 6, . . . ) is different from zero.

By using φ to denote the angular offset of the abovementioned vertical plane with respect to a reference direction at right angles to the optical axis of vertical direction z, (r, φ, z) are, in this equation (1), the usual cylindrical coordinates, R is the nominal radius of curvature, κ is the constant of conicity and $\alpha_{4,6}$, . . . are the coefficients of asphericity. Note too that the nominal radius of curvature R corresponds to the radius of curvature at the position r=0.

In the particular case where said outline can be defined by the equation (1) regardless of the angle φ, said outline exhibits a symmetry of rotation about the optical axis of vertical direction z.

If all the coefficients of asphericity $\alpha_{4,6}$, . . . are zero, the constant of conicity κ influences the type of form of the section. For κ=0, it is a circle, for κ=−1 a parabola, for κ<−1 a hyperbola and an ellipse in the other cases.

Note that the coefficients of asphericity $\alpha_{4,6}$, . . . contribute to modifying the appearance of the initial section (that is to say that which would be defined by the same equation (1) with all the coefficients of asphericity being zero). This modification becomes all the greater with distance away from the origin (that is to say all the greater when r is great).

Thus, the aspherical face according to the invention comprises at least one section having a form that is:
parabolic, hyperbolic or ellipsoid, or
parabolic, hyperbolic or ellipsoid, modified by at least one non-zero coefficient of asphericity, or
circular, modified by at least one non-zero coefficient of asphericity.

Thus, the invention relates also to an optical device for a timepiece, wherein the at least one aspherical face comprises at least one section passing through a vertical plane of which at least one outline is a curve taking the form of a portion of circle modified by a coefficient of asphericity.

Furthermore, the invention relates also to an optical device for a timepiece, wherein the at least one aspherical face comprises at least one section passing through a vertical plane of which at least one outline is a curve taking the form of an ellipse, parabola or hyperbola.

Based on such an optical device having at least one aspherical face, a clear improvement in the legibility and/or visibility of an indication has therefore been observed. In practice, the determination of the precise aspherical form of the surface or face portion of the lens can be made according to several approaches.

According to an approach preferred by the applicant, the aspherical form can be defined on the basis of optimization algorithms composed of two successive steps. In a first step, a global search in the space of the aspherical surfaces makes it possible to determine families of lenses with strong optical potential. This search is based on stochastic algorithms, in particular on Latin hypercube sampling and on genetic algorithms. In a second step, a local search around a representative of each duly determined family makes it possible to optimize by iteration the surface of the lens until a satisfactory solution emerges. The method used in this second step can, for example, be a variation of the Nelder-Mead simplex optimization.

"Satisfactory solution" is understood to mean a solution that makes it possible to at least partially address the conflicting objectives described hereinbelow:
to increase the interval [Θmin, Θmax] as much as possible;
to enlarge, as constantly as possible, the indication concerned, whatever the angle Θ between Θmin and Θmax;
to minimize as much as possible the distortion of the indication concerned that risks causing a wrong reading of said indication.

With such an approach, it then appears, according to the studies of the applicant, that the interval [Θmin, Θmax] can be maximized in the order of 100% with respect to the interval known from the prior art, while constantly enlarging the indication concerned and while minimizing as much as possible the distortion of said indication.

More particularly, an optical device comprising at least one lens comprising at least one aspherical face whose curvature decreases as a function of r constitutes a particularly suitable solution that makes it possible to address the abovementioned objectives.

FIGS. 4 to 9 represent more specifically embodiments of the invention comprising the association of at least one optical device according to the invention with a timepiece glass. This glass extends substantially horizontally. To simplify the reading, the same references will be used to denote elements that are identical or similar in the different embodiments.

According to the first embodiment represented by FIGS. 4 to 7, the optical device 10 comprises a single lens 21, substantially above an indicator 2, for example arranged on a dial of a timepiece.

Figure 4:
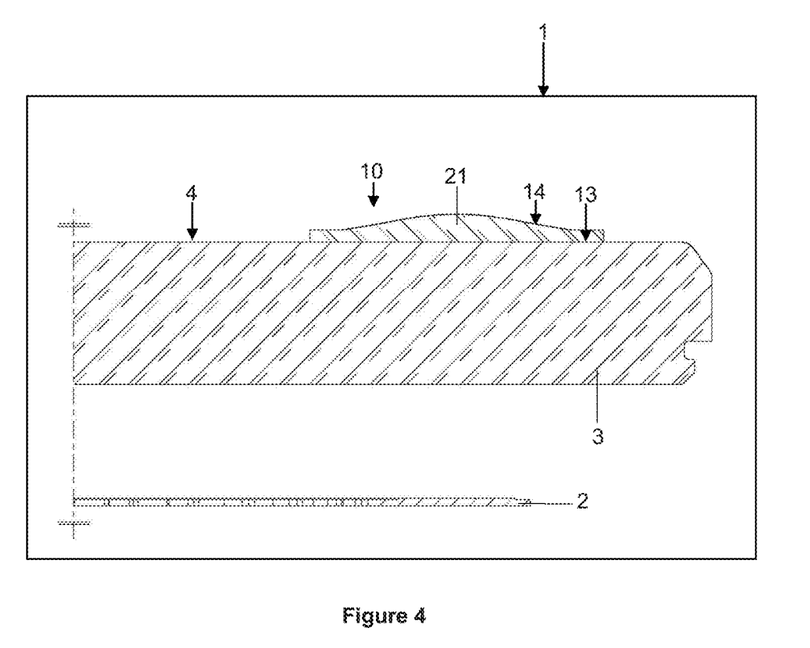
FIG. 4 represents a section passing through a median vertical plane of an optical device of a glass of a timepiece according to a first variant of a first embodiment of the invention.

FIG. 4 represents an optical device 10 added onto the top surface 4 of a watch glass 3, which is substantially planar and horizontal according to this embodiment. This optical device comprises a lens 21 of substantially horizontal bottom surface 13 fixed onto the top surface 4 of the watch glass 3. This fixing can be done by any means, such as gluing. As it appears in FIG. 4, the section of the optical device 10 is delimited by a top curve corresponding to the equation (1) explained previously, with a constant of conicity or at least one value of a coefficient of asphericity that is different from zero. In other words, the top surface 14 of the lens 21 of the optical device 10 gives it its aspherical character, whereas its bottom surface 13 is substantially planar.

Figure 5:
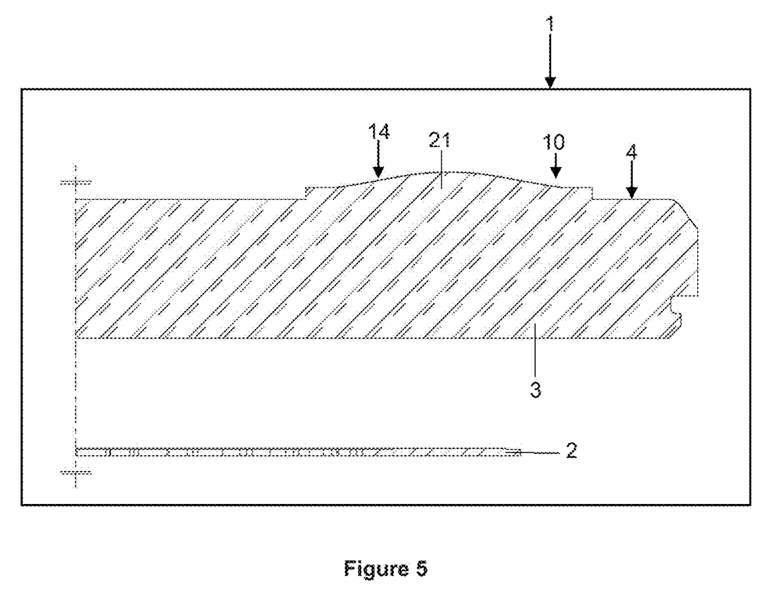
FIG. 5 represents a section passing through a median vertical plane of an optical device of a glass of a timepiece according to a second variant of the first embodiment of the invention.

FIG. 5 represents a second variant of the optical device 10 according to the first embodiment of the invention. This second variant is differentiated from the first variant of FIG. 4 by the fact that the optical device 10 and the glass 3 form a whole that is of a single piece. In other words, the optical device 10 is no longer a distinct element fixed onto the glass. It comes as a part of the glass 3 itself, forming a protuberance above the top surface 4 of the glass 3, to form a whole whose top form is globally the same as in the case of the first variant of FIG. 4.

Figure 6:
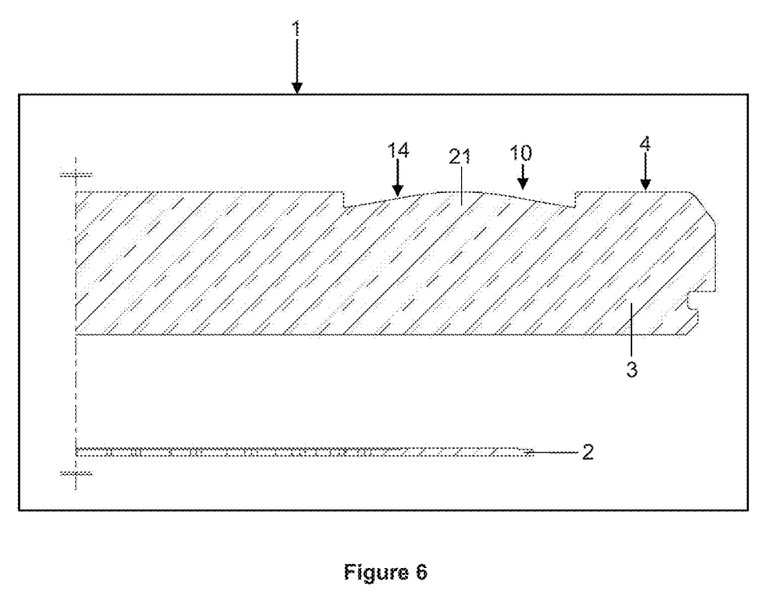
FIG. 6 represents a section passing through a median vertical plane of an optical device of a glass of a timepiece according to a third variant of the first embodiment of the invention.

FIG. 6 illustrates a third variant embodiment in which the optical device 10 and the glass 3 form a whole that is of a single piece. However, in this variant, the optical device is fashioned in the thickness of the glass 3. Thus, the aspherical top face 14 of the lens 21 remains below the level of the top surface 4 of the glass or substantially at the same level as the top surface 4 of the glass. Note that the top surface 14 still has a form similar to the preceding two variants.

Figure 7:
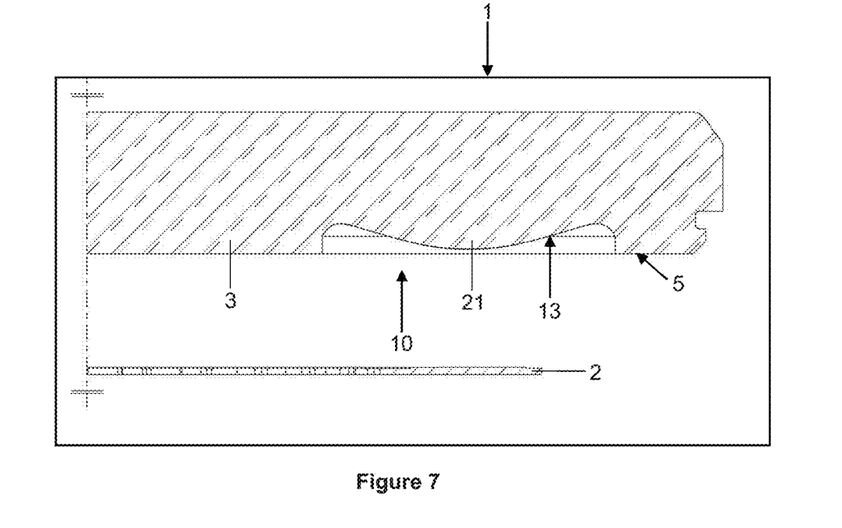
FIG. 7 represents a section passing through a median vertical plane of an optical device of a glass of a timepiece according to a fourth variant of the first embodiment of the invention.

FIG. 7 illustrates a fourth variant embodiment, in which the optical device 10 is fashioned in the thickness of the glass 3 from the bottom surface 5 of the glass. In this embodiment, the optical device 10 and the glass 3 still form a whole that is of a single piece. The bottom surface 13 of the lens 21 of the optical device 10 has an aspherical form.

The studies of the applicant show that the optical device according to the first embodiment offers an enlarged reading of an indication, visible over an angular range that is increased compared to the state of the art by the order of 100%.

In the last three variant embodiments, respectively associated with FIGS. 5 to 7, the optical device 10 can be formed in the glass by any method, in particular a machining method, for example from a laser such as a femtosecond laser, and/or by an etching method.

Figure 8:
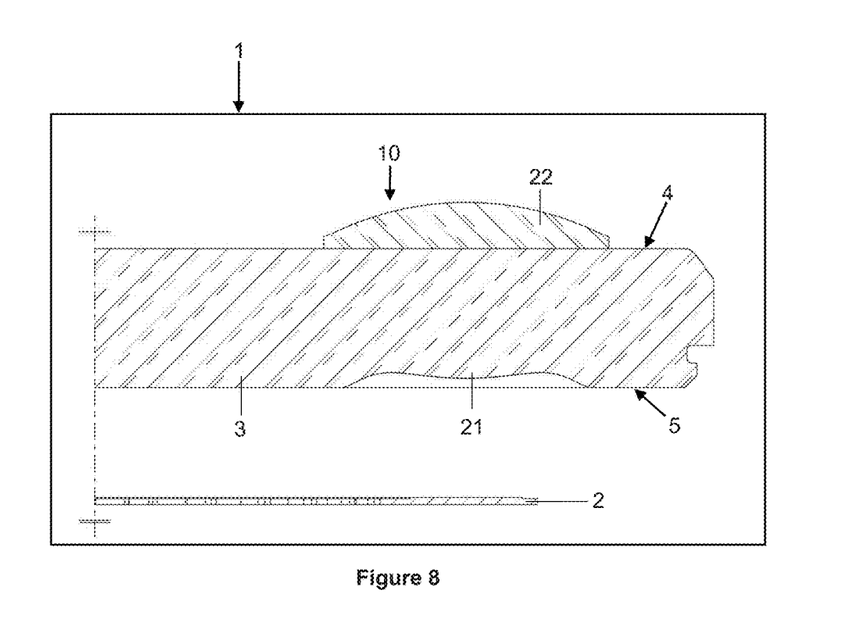
FIG. 8 represents a section passing through a median vertical plane of an optical device of a glass of a timepiece according to a first variant of a second embodiment of the invention.
Figure 9:
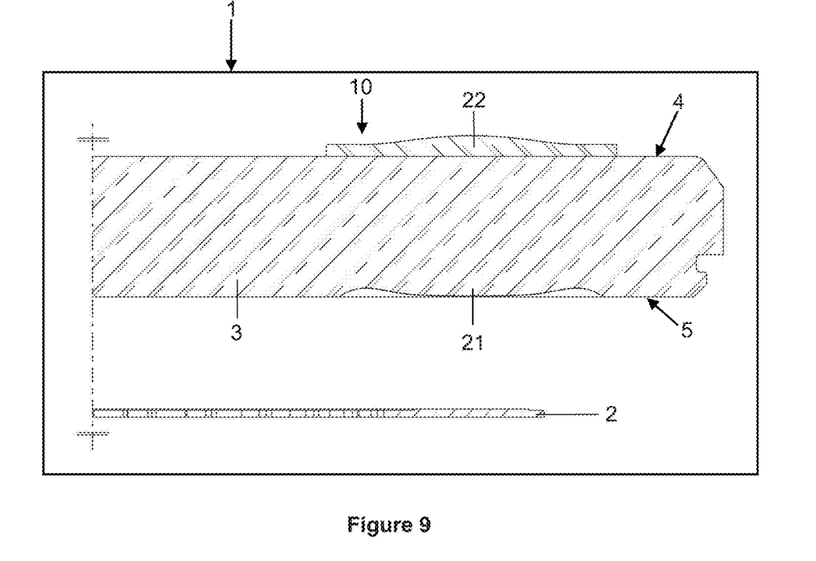
FIG. 9 represents a section passing through a median vertical plane of an optical device of a glass of a timepiece according to a second variant of the second embodiment of the invention.

According to the second embodiment represented by FIGS. 8 and 9, the optical device 10 comprises two superposed lenses 21, 22, respectively arranged on the top 4 and bottom 5 surfaces of the timepiece glass 3.

FIG. 8 thus illustrates a first variant of the second embodiment. The optical device thus comprises a first lens 21 fashioned in the bottom surface of the glass 3, like the embodiment of FIG. 7. This first lens is aspherical, that is to say that it comprises at least one aspherical face. In addition, the optical device 10 comprises a second lens 22 fixed onto the top surface 4 of the glass, superposed on the first lens. This second lens 22 is spherical. It adds a second enlarging effect, complementing that of the first lens.

FIG. 9 illustrates a second variant embodiment, which is differentiated from the first variant in that the second lens 22 is also aspherical. Advantageously, such a lens 22 complements the enlarging effects provided by the first lens 21 while attenuating the distortion effects generated by the first lens 21.

This second lens 22 is similar to the lens of the optical device of the first variant of the first embodiment of FIG. 4. As a variant, this second lens could be similar to the lens of the optical device of the two other variants of the first embodiment of FIGS. 5 and 6. The first lens 21 remains identical to that of the first embodiment of FIG. 8.

In all the cases, the optical device and/or the at least one lens that it comprises occupies a surface area less than or equal to 30% of the total surface area of the glass of the timepiece.

The studies of the applicant show that the optical device according to the second embodiment offers an enlarged reading of an indication, improved with respect to that offered by the optical device according to the first embodiment, and visible over an angular range that is increased relative to the state of the art, in the order of 100%.

Naturally, the invention is not limited to the embodiments described. In particular, these embodiments can be combined. Furthermore, the optical device has been described on the basis of one or two superposed lenses. As a variant, the optical device can comprise three lenses or more. These lenses are at least partially superposed. Furthermore, a lens has been arranged on a top or bottom surface of a glass. As a variant, such a lens can be positioned at any point in the thickness of the glass. The lens or lenses can even extend over all the thickness of the glass.

Also, over all the variants represented, the optical device ultimately comprises a lens with an aspherical portion, and in particular an aspherical face. This aspherical face is convex. As a variant, the lens could be biconvex, that is to say have two opposing convex faces. Furthermore, these two faces could both be aspherical. Thus, the optical device could comprise two aspherical top and bottom surfaces.

Furthermore, the horizontal outline of the optical device, that is to say the outline defined by a section of the optical device along a horizontal plane, or by the projection of the optical device onto a horizontal plane, in particular the plane P of the timepiece, can take different forms. It can, for example, be circular, square, rectangular or ellipsoid.

The lenses of the optical device can be produced in a hard crystalline material, in corundum, sapphire or spinel in particular. Alternatively, the lenses of the optical device can be produced in glass, in mineral glass in particular. As another alternative, the material forming the lenses of the optical device can be made of polymer, in particular polymethyl methacrylate (PMMA). Whatever the variant embodiments, the glass of the timepiece can likewise be produced in a hard crystalline material, in particular in corundum, sapphire or spinel. Similarly, the glass can alternatively be produced in glass, particularly in mineral glass or in polymer, in particular in polymethyl methacrylate (PMMA). The lens or lenses can be manufactured in the same material as that of the glass or not. Finally, the at least one lens is advantageously made of a rigid material. This rigid material is non-deformable, and it is not designed to be deformed in the normal use of the timepiece. It has little or no plastic range. The at least one lens can advantageously be fully formed in this rigid and non-deformable material. As a variant, the at least one lens comprises at least one outer envelope at least substantially fully surrounding it and is formed in a non-deformable rigid material.

In all the embodiments, the optical device has been associated with a glass of a timepiece. In these embodiments, the optical device is fixed relative to the glass and to the timepiece. As a variant, the optical device could be arranged in the timepiece independently of the glass. For example, it could be arranged between a dial comprising an indicator and a glass of the timepiece. In addition, the optical device has been arranged fixed within the timepiece. It could, as a variant, be mobile relative to the timepiece, for example by being mounted on a hand of the timepiece.

The indicator 2 of the timepiece can be designed to display any type of indication, in particular an hourly indication, such as, for example, a display of the hour or of the minutes, or any type of time-derived indication, such as a calendar indication such as the indication of the day of the month, of the day, of the months or of the phases of the moon. This indicator can be mobile, and can be designed to display a particular indication in a window of a dial. In this case, the optical device is advantageously superposed on the dial window so as to optimize the visibility of the indication appearing in the window.

Alternatively, the indicator can be fixed and can, for example, comprise several distinct indications added at different locations on a dial. In this case, the optical device can be mobile with respect to the indicator so as to optimize the visibility of the indication to be considered, which is only a part of the plurality of the indications of the indicator.

In all the cases, the indications can be annotations such as numerals, letters, or even colors. The indicator is advantageously positioned in a plane parallel to the plane of the glass and/or of a lens of said optical device. The "plane of the glass" corresponds advantageously to a plane parallel to the top surface of the glass and/or passing through the top surface of the glass.

Finally, said glass can:
participate in forming a sealed and fixed envelope of the timepiece, and/or
be arranged parallel to the plane in which there is an indicator to be enlarged, and/or
comprise at least one lens comprising at least one aspherical face occupying a surface area less than or equal to 30%, even less than or equal to 20%, even less than or equal to 10%, of the total surface area of the top surface of the glass, and/or
comprise at least one lens comprising at least one aspherical face superposed in the substantially vertical direction on at least one indicator to be enlarged of the timepiece, and/or
comprise at least one lens comprising at least one aspherical face that is fixed relative to said glass.

Figure 10:
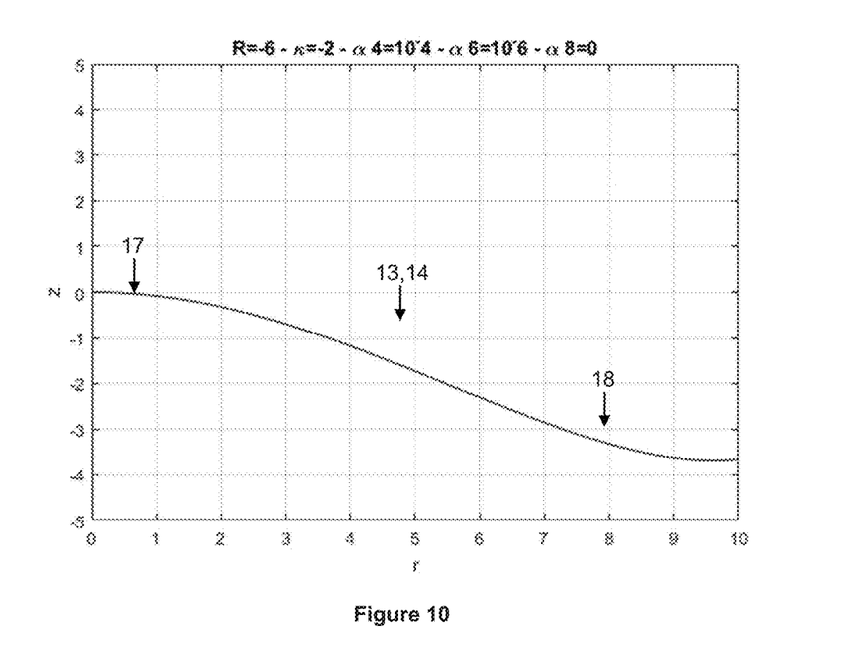
FIG. 10 illustrates the geometry of an optical device for a timepiece according to an embodiment of the invention.

In addition, as has been stated previously, an optical device is considered to be aspherical when it comprises at least one face comprising at least one aspherical portion. Thus, according to an exemplary embodiment represented by FIG. 10, such an aspherical face 13, 14 can, for example, comprise a section whose outline comprises a portion of a circle 17 in its central part, and comprises at least one inflection point 18. At the inflection point 18 there is a change of concavity or of convexity of the outline of said section.

Finally, an aspherical face of an optical device according to an embodiment of the invention may or may not exhibit a symmetry of rotation about a central vertical axis. Moreover, an optical device according to an embodiment of the invention may or may not exhibit a symmetry relative to a vertical median plane.

The invention claimed is:

1. A timepiece comprising an optical device,
the optical device comprising at least one lens intended to enlarge an indication supplied by a timepiece,
the at least one lens comprising at least one aspherical face,
the at least aspherical face comprising at least one section passing through a vertical plane comprising an optical axis of vertical direction z,
wherein at least one outline of the at one section of the at least one aspherical face is defined by the following equation:

$$z(r) = \frac{r^2}{R\left(1 + \sqrt{1-(1-\kappa)\frac{r^2}{R^2}}\right)} + \alpha_4 r^4 + \alpha_6 r^6 + \ldots$$

in which
R is the nominal radius of curvature,
k is the constant of conicity, and
$\alpha_{(4,6,\ldots)}$ is or are coefficient(s) of asphericity,
and in which at least the constant of conicity k and/or at least one coefficient of asphericity is different from zero.

2. The timepiece glass as claimed in claim 1, wherein at least one selected from the group consisting of (i) the at least one lens comprises at least one outer envelope surrounding it the at least one lens fully made of non-deformable rigid material, (ii) the at least one lens is fully made of non-deformable rigid material, and (iii) the at least one lens is produced in a hard crystalline material.

3. The timepiece glass as claimed in claim 1, wherein the at least one lens comprises at least one aspherical convex face.

4. The timepiece glass as claimed in claim 1, wherein the at least one aspherical face comprises a symmetry about a vertical axis.

5. The timepiece glass as claimed in claim 1, wherein the at least one aspherical face comprises a section passing through a vertical plane, wherein at least one outline of the vertical plane comprises a portion of a circle and a point of inflection, inducing a change of concavity or of convexity.

6. The timepiece glass as claimed in claim 1, wherein the at least one lens is a single lens comprising the at least one aspherical face.

7. The timepiece glass as claimed in claim 1, wherein the timepiece glass comprises the lens comprising the at least one aspherical face formed on or added to a top or bottom surface of the glass.

8. The timepiece glass as claimed in claim 1, wherein the lens comprising the at least one aspherical face is arranged on a bottom surface of the glass, and another lens is arranged superposed on the lens on a top surface of the glass.

9. The timepiece glass as claimed in claim 1, wherein the lens comprises the at least one aspherical face and a section passing through a plane parallel to a surface of the glass that is substantially circular or substantially ellipsoid.

10. The timepiece glass as claimed in claim 1, wherein the lens comprising the at least one aspherical face is made of the same material as the glass.

11. A timepiece comprising a glass as claimed in claim 1.

12. The timepiece as claimed in claim 11, wherein the timepiece comprises at least one indicator selected from the group consisting of a time indicator, a calendar indicator, an indicator comprising an annotation, and an indicator comprising a pattern, and wherein the at least one lens comprising the at least one aspherical face of the glass is arranged above the indicator.

13. The timepiece as claimed in claim 11, wherein the timepiece comprises a mobile indicator, arranged to display a particular indication in a window of a dial of the timepiece, and wherein the at least one lens comprising the at least one aspherical face of the glass is arranged above the window of the dial so as to optimize visibility of the particular indication appearing in the window.

14. The timepiece as claimed in claim 12, wherein at least one selected from the group consisting of (i) the at least one indicator is arranged in a plane parallel to the glass comprising the at least one lens comprising the at least one aspherical face, and wherein the at least one lens comprising the at least one aspherical face occupies a surface area less than or equal to 30% of a total surface area of a top surface of the glass, (ii) the at least one lens comprising the at least one aspherical face is superposed in a direction substantially vertical to the at least one indicator, and (iii) the at least one lens comprising the at least one aspherical face is fixed relative to the glass.

15. The timepiece as claimed in claim 12, wherein the glass forms a tight envelope for the at least one indicator, and wherein the at least one lens comprising the at least one aspherical face is superposed on the at least one indicator.

16. The timepiece as claimed in claim 12, wherein the at least one indicator is selected from the group consisting of an hour indicator, a display of hours, a display of minutes, an indicator of the day of the month, an indicator of the day, an indicator of the month, an indicator of the phases of the moon, an indicator comprising at least one numeral, an indicator comprising at least one letter, and an indicator comprising at least one color.

17. The timepiece glass as claimed in claim 4, wherein the symmetry of the at least one aspherical face about the vertical axis is a symmetry of revolution.

18. The timepiece glass as claimed in claim 1, wherein the timepiece glass comprises two lenses, a first of the two lenses comprising at least one aspherical face.

19. The timepiece glass as claimed in claim 1, wherein the timepiece glass comprises two lenses, each of the two lenses comprising at least one aspherical face.

20. The timepiece glass as claimed in claim 1, wherein the lens comprising the at least one aspherical face is formed directly in the thickness of the glass.

* * * * *